United States Patent [19]

Tangorra et al.

[11] Patent Number: 4,614,509
[45] Date of Patent: Sep. 30, 1986

[54] TOOTHED BELT

[75] Inventors: Giorgio Tangorra, Monza; Mario Cicognani, Milan; Vincenzo Macchiarulo, Chieti, all of Italy

[73] Assignee: Industrie Pirelli S.p.A., Milan, Italy

[21] Appl. No.: 709,367

[22] Filed: Mar. 11, 1985

Related U.S. Application Data

[63] Continuation of Ser. No. 467,794, Feb. 18, 1983, abandoned.

[30] Foreign Application Priority Data

Feb. 26, 1982 [IT] Italy ............................... 19872 A/82

[51] Int. Cl.$^4$ ................................................ F16G 1/28
[52] U.S. Cl. ..................................... 474/205; 474/153
[58] Field of Search ................................ 474/205, 153

[56] References Cited

U.S. PATENT DOCUMENTS

| 2,182,461 | 12/1939 | Yeakel | 474/205 |
| 2,988,925 | 6/1961 | Sauer | 474/205 |
| 3,621,727 | 11/1971 | Cicognani | 474/205 |
| 3,937,094 | 2/1976 | Cicognani | 474/205 |
| 4,283,184 | 8/1981 | Berg | 474/205 X |

FOREIGN PATENT DOCUMENTS

| 52-117751 | 9/1977 | Japan | 474/205 |
| 1404250 | 8/1975 | United Kingdom | 474/205 |

Primary Examiner—James A. Leppink
Assistant Examiner—Frank McKenzie
Attorney, Agent, or Firm—Stevens, Davis, Miller & Mosher

[57] ABSTRACT

A toothed belt constituted by an annular body of elastomeric material, having a structure that is resistant to tensile stress embedded therein and having a toothing on one of its faces. The teeth of said annular body have at least one slot corresponding to their own top.

8 Claims, 7 Drawing Figures

TOOTHED BELT

BACKGROUND OF THE INVENTION

1. Field of the Invention

The present invention concerns a toothed belt, the belt being constituted by an annular body of elastomeric or similar material in which a structure resistant to tensile stress is embedded. The toothed belt being further characterized by the fact that one face of said annular body has a toothing of elastomeric material.

2. Prior Art

Several types of toothed belts that fit the general description given above are already well known. In general, toothed belts are used in conjunction with at least two toothed pulleys to form a transmission. In all the previously known types of toothed belts, the contours of the toothed belt's teeth are conjugate to the contours of the toothed pulley's teeth. In fact, in a toothed belt and toothed pulleys transmission, the movement is transmitted by a meshing between the toothed belt's teeth and the toothed pulleys' teeth which is similar to the meshing seen with metallic driving gears. However, with a toothed belt and toothed pulleys transmission, in contrast to metallic driving gears wherein all the components of the driving gears are rigid, one of the components of the transmission, namely the toothed belt, is made of an elastomeric material and a deformability which is much greater than that of the other components, namely the toothed pulleys.

The difference in deformability between the toothed belt and the toothed pulleys, and more precisely between the teeth of the toothed belt and the teeth of the toothed pulleys, causes sliding to occur between the teeth of the transmission components when the pressure existing between them is high. Consequently, the toothed belt's teeth are subject to a great deal or wear. In order to avoid and try to limit this wear of the toothed belt's teeth, different contours of the belt's teeth have been studied and proposed in an attempt to reduce sliding between the transmission components. Particular elastomeric compounds have been studied in order to obtain a maximum hardness of the toothed belt's teeth without excessively limiting the flexibility of the toothed belt as a whole.

In spite of the above-mentioned artifices, the problem of wear of the teeth of toothed belts has not been satisfactorily resolved by the previously known designs for toothed belts. Furthermore, because of the great deformability of the teeth of a toothed belt, which are made of an elastomeric material, with respect to the deformability of the metallic teeth of the toothed pulleys, the stresses on the teeth when in a meshed state between a toothed belt and a toothed pulley varies during the movement of the transmission. More particularly, the maximum stress on a tooth of a toothed belt occurs when said tooth begins to be inserted into a groove of the driving toothed pulley. The greatest sliding between the teeth of the belt and those of the pulley also occurs at this time.

Once the insertion of a tooth of the toothed belt into the groove of the driving toothed pulley has occured, the stress on said tooth decreases while the tooth moves together with the driving toothed pulley until the tooth of the toothed belt leaves the toothed pulley. Again, because of this variation of stresses on the tooth of the toothed belt, settling movements of the tooth of the toothed belt within the groove of the toothed pulley occur, and these movements cause further sliding with consequent wear. The settling movements also generate vibrations in the toothed belt and in the transmission which result in the production of noises as well as a further reduction in the lifetime of the toothed belt.

SUMMARY OF THE INVENTION

A principal object of the present invention is to resolve the above-mentioned problems seen with the previously known types of toothed belts, and to have, at the same time, a toothed belt that may be coupled to any sort of toothed pulley, and more precisely, a toothed belt that may be coupled to toothed pulleys having any sort of tooth contour, and the transmission comprising said toothed belt.

Another object of the present invention is the provision of a toothed belt comprising an annular body of elastomeric or similar material in which is embedded a structure resistant to tensile stress. The tensile stress resistant structure comprises a plurality of flexible and inextensible cords, arranged along the greatest dimension of the belt, the axes of which are parallel and coplanar to one another. The toothed belt further comprises a toothing on one face of the annular body constituted by a plurality of teeth separated from one another by grooves, the teeth being characterized by the fact that each tooth has a contour that comprises, in correspondence to its own top, means to give the top of the tooth a localized elastic deformability.

BRIEF DESCRIPTION OF THE DRAWINGS

The present invention will be better understood through the following detailed description, given purely as an example and which is therefore in no way limitative, made with reference to the figures of the attached table of drawings in which.

DESCRIPTION OF THE PREFERRED EMBODIMENT

According to the most general concept of the present invention, a toothed belt is provided, in correspondence to the top of each of its own teeth, with means which give the tops of the teeth a general elastic deformability, preferably a flexion elastic deformability, in such a manner that each tooth can modify its own contour and be coupled to a toothed pulley independently of the profile shape of the toothed pulleys' grooves, thus eliminating the necessity for the contours of the teeth of toothed belts to be conjugate to the contours of the teeth of toothed pulleys and vice versa.

One essential characteristic of a toothed belt made according to the present invention is the presence on the top of the teeth of at least two ribs (or at least one slot or groove). This characteristic is necessary in order to provide the top of said teeth with a deformability or preferably a flexion elastic deformability resulting from the geometrical shape, while the remaining part of the teeth's contour may have any sort of configuration.

Figure 1:
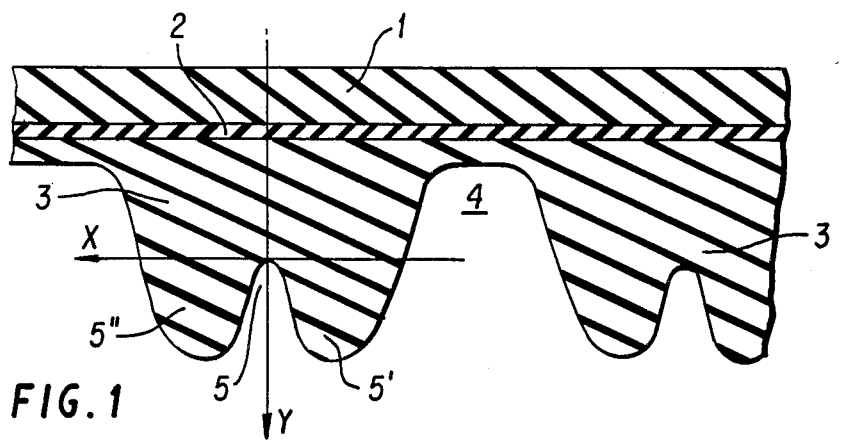
FIG. 1 shows in section a portion of a toothed belt made according to the invention.

In FIG. 1 a portion of a toothed belt made according to the present invention is represented in sectional view. As can be seen in FIG. 1, the toothed belt has a body 1 made of elastomeric or plastic material in the form of a closed ring in which a structure resistant to tensile stress is embedded, said structure being formed by a plurality of flexible and inextensible cords 2. The cords may consist of, for example, steel or glass fibers of a similar material, and are arranged according to the greatest dimension of the belt with their axes being parallel to and coplanar with one another. On at least one face of the body 1 of the belt, a toothing is present which is formed by a plurality of teeth 3 of elastomeric or plastic material, separated from each other by grooves 4.

A fundamental characteristic or feature of a toothed belt according to the present invention is that it possesses means, in correspondence to the top or summit of each tooth of the belt, that give an elastic deformability to the top of the tooth alone, and in particular a flexion type elastic deformability, due to the geometrical configuration of the summit or top of the tooth. As is shown in FIG. 1, in correspondence to the head of the tooth 3 there is at least one slot or groove 5 present. The groove 5 is placed so as to be in a transverse relationship with the largest dimension of the belt and defines at least two ribs 5' and 5" in the top of the tooth 3. In particular, the geometrical configuration of the tooth's top may be obtained by giving, purely as an example, to the entire tooth a contour corresponding to a biquadratic curve that corresponds, in a system of cartesian axes such as that represented in FIG. 1, to the following formula:

$$y = k(x^4 - x^2)$$

wherein:

y are the ordinates of the points of the curve measured on the axis Y coinciding with the center line of the tooth of the toothed belt;

x are the abscissas of the points of the curve measured on the axis X which is an axis that is perpendicular to the axis Y and intersects the same in correspondence to the bottom of the slot or groove 5 present on the top of the tooth;

k is a coefficient depending upon the hardness of the elastomeric material the values of which are chosen within the range of values wherein the extremes are 0.05 and 2, and preferably within a range of values wherein the extremes are 0.1 and 1.5.

The choice of a value within the range of values mentioned above for the coefficient k must be made empirically in order to optimize the performance of the toothed belt, taking into account the following factors:

(a) the amount of interference between the contours of the teeth of the toothed belt and the grooves of the toothed pulley;

(b) the value of the modulus of the elastomeric material with which the teeth of the toothed belt are made; and (c) the amount of power to be transmitted with the toothed belt.

As factors (a) and (b) increase it becomes advisable to choose the higher values within the range of values for the coefficient k. On the other hand, as factor (c) increases it becomes advisable to choose the lower values within the range of values for the coefficient k. For this reason, the choice of the coefficient k's value within the range given above cannot be but empirical, it being kept in mind that, regardless of what value of k is chosen within the given range, it is possible to obtain a toothed belt according to the present invention which makes it possible to satisfactorily achieve the proposed objectives.

The tooth of the belt, in correspondence with its own top where the slot is present may have a width greater than the width of the bottom portion of the grooves of the toothing of a toothed pulley so that the tops of the teeth of the toothed belt are received in the grooves of the teeth of the toothed pulleys in a deformed condition.

Figure 6:
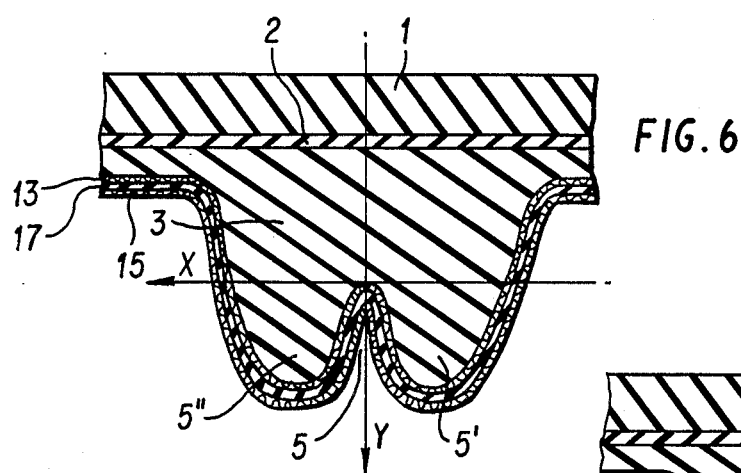
FIG. 6 shows a covering of a suface of a toothed belt according to the present invention.

Although not represented in FIG. 1, the surface of the toothing of the toothed belts, that is the surface of both the teeth 3 and the grooves 4, is covered with a material having a low coefficient of friction. A self-lubricating covering material of rubberized fabric, such as the one described in Applicant's Italian Pat. No. 864,204 is particularly suitable to be used as a covering material with a low coefficient of friction. Preferably, the covering of the surface of the toothed belt's toothing is constituted by two rubberized fabrics 13 and 15 as shown in FIG. 6 doubled together with the interposition of a layer or film of elastomeric material 17, wherein the outer layer of rubberized fabric is of the self-lubricating type defined above. Such a type of covering for the toothed belt's toothing is described in Applicant's Italian Pat. No. 973,166.

Figure 2:
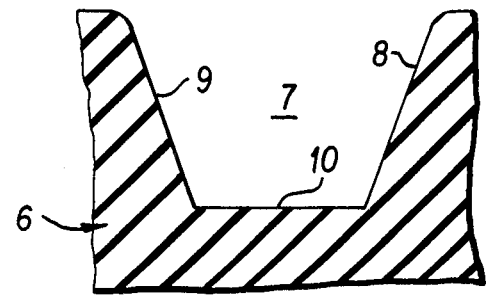
FIG. 2 shows in section a portion of a toothed pulley.

A toothed belt made according to the present invention may be coupled with any toothed pulley, independently of the geometrical configuration possessed by the teeth of the toothed pulley, and therefore independently of the geometrical shape possessed by the grooves of a toothed pulley. As an example, in FIG. 2, a portion of a toothed pulley 6 has been represented in a sectional view normal to the axis of rotation of the toothed pulley, the groove 7 of which has, in section, the shape of an isoseles trapezium with straight sides 8 and 9 and also a straight bottom 10. However, this should not be construed in a limitative sense, since sides 8 and 9 may have a curved contour, or an involute contour or the like, and the bottom 10 may have either a straight contour or a curved contour, be it concave or convex. Furthermore, the groove 7 may also have a contour in which the sides and the bottom are no longer clearly distinguishable. In other words, a curved contour such as, for example, a semicircular, semieliptical or parabolic contour and so on can be provided.

The correlations that exist between the toothing of the toothed belt and the toothing of the toothed pulleys, are the following:

(a) the pitch of the toothing of the toothed belt is the same as the pitch of the toothing of the toothed pulleys, otherwise the teeth of the toothed belt could not be received into the grooves of the toothed pulleys;

(b) the height of each tooth of the toothed belt, in undeformed condition, is the same or less or greater than the depth of the grooves of the toothed pulleys; and (c) the width of the teeth of the toothed belt must generally be such as to allow the teeth of the toothed belt to enter into the slots of the toothed pulley without allowing sliding between the sides of the teeth of the toothed belt and the sides of the teeth of the toothed pulleys to occur, until such time as the interference between the contour of the tops of the teeth of the toothed belt and the contour of the bottom of the grooves of the toothed pulley comes into effect with consequent deformation of the top of the toothed belt's teeth.

The operation of a toothed belt made according to the present invention in a toothed belt and toothed pulleys transmission, wherein the toothed pulleys are of any type whatsoever, will now be described with reference to FIGS. 3 and 4. As is well known, the working of a toothed belt and toothed pulleys transmission occurs because the driving pulley transmits the movement to the toothed belt and the latter in turn transmits the movement to the other toothed pulley. The transmission of movement in a toothed belt and toothed pulleys transmission occurs by means of the exchange of forces that occurs between the teeth of the toothed belt and the teeth of the toothed pulleys when these teeth are meshed with each other. During the movement of the transmission, a tooth of the toothed belt that is meshed with a tooth of a toothed pulley, for example the driving toothed pulley, is lodged into a groove of the latter. At a certain point, the tooth of the toothed belt leaves the driving pulley and subsequently penetrates into a groove of the driven toothed pulley in order to be coupled to a tooth of the latter. After having entered a groove of the driven toothed pulley, the tooth of the belt moves together with this pulley and afterwards leaves it, in order to become engaged once again by the driving toothed pulley by entering into a groove of the latter.

A phenomenon that characterizes all the transmissions of movement between a toothed belt and toothed pulleys immediately appears from the above discussion. The phenomenon consists of the fact that a tooth of the belt penetrates into a groove of a pulley and, after having travelled along a certain portion of path with it, comes out of the groove again. Along this path the stress on the toothed belt's tooth varies and, for example, in the case of the driving toothed pulley decreases.

Figure 3:
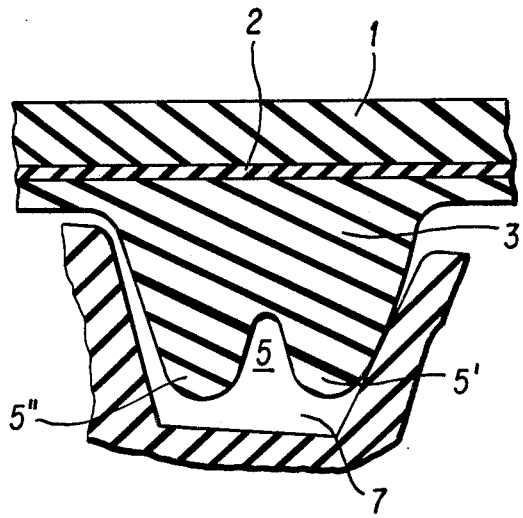
FIG. 3 shows in section a portion of a toothed belt according to the invention and a portion of a toothed pulley during the insertion of a tooth of the toothed belt into a groove of a toothed pulley.

In FIG. 3 a tooth of a toothed belt is represented while it is penetrating into a groove of a toothed pulley of any type whatsoever. As can be seen in FIG. 3, which represents only a particular form of realization, since the contour of the groove of the toothed pulley is not conjugate to the contour of the tooth of the toothed belt, and since the height of the tooth of the belt is greater than the depth of the groove of the toothed pulley, an interference occurs during the insertion of the belt's tooth into the pulley's groove. The interference causes a deformation of the tooth 3 to take place, since the groove of the toothed pulley is relatively undeformable because it is made of a metallic material, while the tooth of the toothed belt is deformable, not only because of the fact that it is made of an elastomeric material, but particularly due to the fact that it is provided with at least one slot 5 in correspondence to the top of the tooth, the presence of which originates at least two protuberances 5' and 5''. The deformation of the tooth 3 takes place first of all with a deformation by flexure of the protuberance 5' which is the protuberance nearest to the area of interference. As the tooth 3 penetrates into the groove 7, the deformation, due to flexure of the protuberance 5', increases so that the protuberance 5' can come into contact with the bottom of the groove 7. At a certain point of the penetration of the tooth 3 of the toothed belt into the groove 7 of the toothed pulley, the other protuberance 5'' of the tooth 3 also comes into a condition of interference with the contour of the groove 7, and therefore the second protuberance 5'' also begins to deform due to flexure which increases in value until the tooth 3 of the toothed belt is completely inserted in the groove 7 of the toothed pulley.

Figure 4:
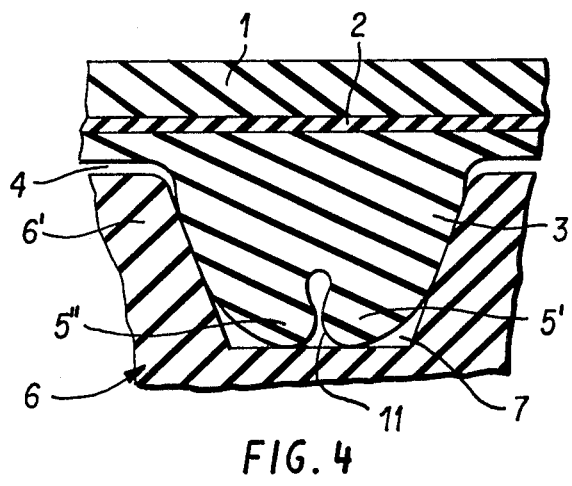
FIG. 4 shows in section a portion of a toothed belt-toothed pulley transmission with a tooth of the toothed belt completely insertd into a groove of a toothed pulley.
Figure 5:
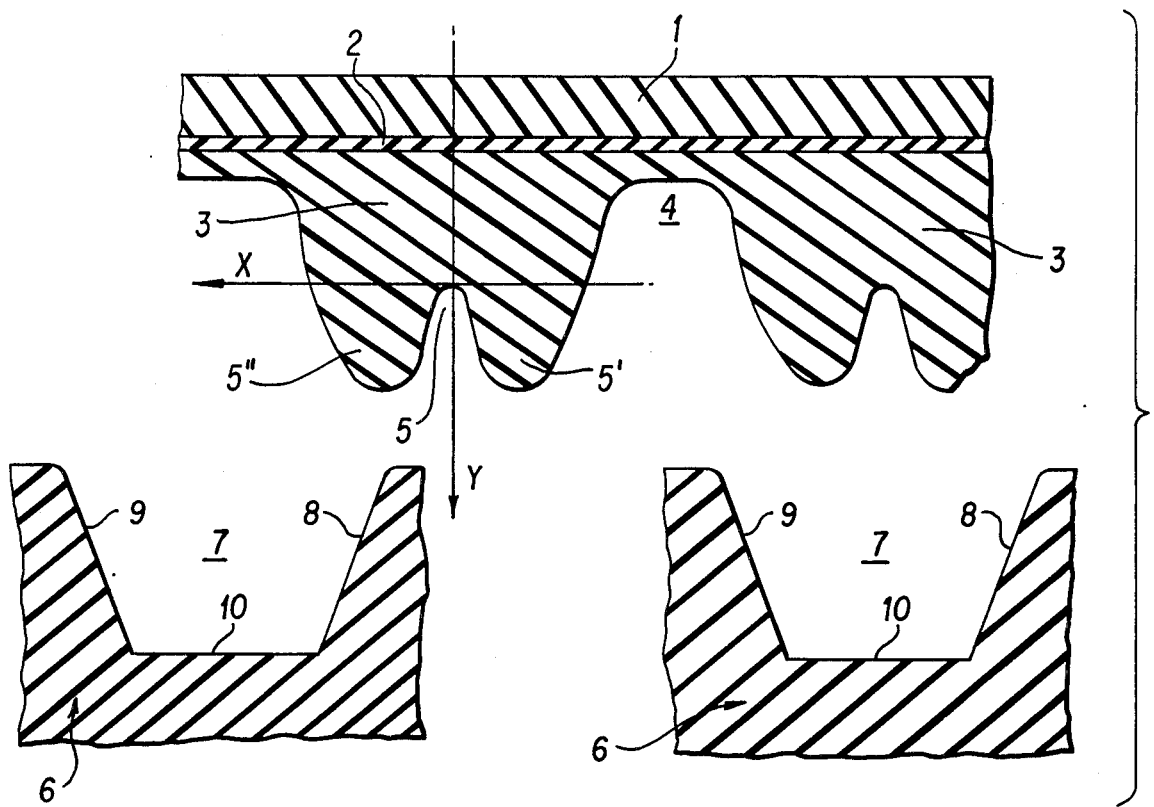
FIG. 5 shows a toothed belt according to the present invention for use with two toothed pulleys.

Referring to FIG. 4, the tooth 3 fills the groove 7 of the toothed pulley having its own top, that is to say the two ribs 5' and 5'', deformed by flexure, while the bottom of the groove 4 of the toothing of the toothed belt could rest on the tops of the teeth of the toothed pulley 6.

Figure 7:
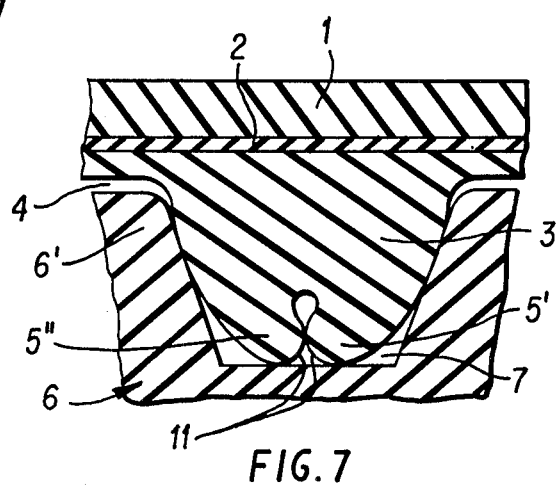
FIG. 7 shows in section a tooth of the toothed belt of FIG. 4 with its ribs being in reciprocal contact with each other.

It is even possible that, with the complete insertion of the teeth of the toothed belt into the grooves of the toothed pulley, the deformation by flexure of the ribs 5' and 5'' can be such as to bring them into reciprocal contact with one another, such as, for example, in the areas designated by reference numeral 11 in FIG. 4. This reciprocal contact condition is illustrated in FIG. 7.

In the embodiments of a toothed belt represented in the figures and previously described herein the presence of only two ribs 5' and 5'' on the top of the tooth, that define between them a slot 5, is foreseen, and the interference of the teeth of the toothed belt with the grooves of the toothed pulley is foreseen substantially in correspondence with the sides of the grooves of the toothed pulley. However, this example must not be understood to be at all limitative, since the present invention includes an alternative embodiment that has not been represented herein comprising a toothed belt wherein on the tops of the teeth of said toothed belt there can be more than two ribs, and wherein the interference between the tops of the teeth of the toothed belt and the grooves of the toothed pulley can take place only on the bottom of the grooves of the toothed pulley.

According to yet another alternative embodiment, the interference of the teeth of the toothed belt with the grooves of the toothed pulleys can take place both between the top of the tooth of the toothed belt where there are the protuberances and the sides and the bottom of the grooves of the toothed pulley.

From the aforegoing description it is easily understood how, with a toothed belt made according to the invention, the proposed purposes and objectives are achieved. The possibility of making the contour of the teeth of the toothed belt independent from the contour of the grooves of the toothed pulleys allows the toothed belt a maximum amount of interchangeability with the toothed pulleys. The teeth of the toothed belt have a contour that is not conjugate to the teeth of the toothed pulley and the belt teeth can have a height that is either greater, lesser or equal to that of the grooves of the toothed pulley provided that there is interference between the contour of the tooth of the toothed belt and that of the groove of the toothed pulley. Furthermore, a toothed belt made according to the invention makes it possible to noticeably reduce wear due to slipping, in as much as although sliding between the teeth of the toothed belt and the grooves of the toothed pulleys does exist, the pressure exercised upon contact between these elements is reduced due to the deformability of the tooth of the toothed belt as a consequence of its geometrical form. Wear due to sliding of the teeth of the toothed belt during their insertion into the grooves of the toothed pulleys is furthermore reduced because of the fact that the teeth of the belt that are already meshed in the same pulley have a considerable stability of position within the grooves that house them. This stability of position prevents the teeth from undergoing very small movements due to the continuous variation of load on the tooth of the toothed belt in its movement with the toothed pulley and avoids the creation of longitudinal distortions in the tension resistant insert of the toothed belt.

The stability of position of the teeth of the toothed belt within the grooves of the toothed pulleys, besides optimizing the entrance and exiting of the teeth, also brings about a reduction of the loads on the tooth and a reduction of the vibrations of the transmission. Consequently, an increase in the useful lifetime of the transmission and a reduction in the noise of the transmission during operation are seen. In addition, the stability of position allows for the possibility of increasing the transmittable power, and reduces the likelihood that the phenomenon known as "tooth skipping" will occur. Furthermore, the driving gear's noise is reduced by means of the fact that during the insertion of the teeth of the toothed belt the presence of the slot on the top of the teeth helps the exiting of the air from the pulley grooves. Finally, the presence of the slots in correspondence with the teeth tops of the toothed belt, that remain even after complete insertion of the teeth of the belt into the grooves of the toothed pulleys, brings about a reduction in the weight of the toothed belt as a whole, which means a reduction of the mass in movement constituted by the belt, and therefore a reduction in the vibrations of the transmission.

Although only one form or embodiment of the present invention has been illustrated and described, it is understood that the invention includes in its scope any other alternative variations accessible to a technician of this field.

What is claimed is:

1. A toothed belt for coupling with a pulley having a plurality of first teeth with adjacent first teeth being separated by first grooves, said belt comprising:
   an annular body of elstomeric material, said annular body having a first surface portion and a second surface portion;
   a tensile stress-resistant structure embedded in said annular body, said structure comprising a plurality of flexible and inextensible cords with axes arranged along the greatest dimension of the belt, the axes of said cords being parallel to and coplanar with one another;
   a toothing on one of said surface portions of said annular body, said toothing comprising a plurality of second teeth formed from an elastomeric material, said second teeth having top and bottom portions, said second teeth being separated from one another at their bottom portions by second grooves; and
   each said second tooth including means to give a localized elastic deformation to the top portion of said second teeth, said means comprising a contour determined by a biquadratic curve corresponding to the top portion of each second tooth of said plurality of second teeth, said contour including a slot between two ribs in each top portion alone of each second tooth, each second tooth having along a portion of its length corresponding to the depth of its slot a width greater that a width of a corresponding portion of a said first groove separating adjacent said first teeth of said toothed pulley, whereby during said coupling a said top portion of each second tooth is compressed at its slot by pressure applied thereto by walls of a corresponding portion of said first groove and whereby deformation by flexure of said two rivs and complete insertion of said second teeth of said annular body into said first grooves of said toothed pulley bring said two ribs toward each other.

2. A toothed belt according to claim 1 wherein the contour of each tooth is determined by a biquadratic curve corresponding to the formula:

$$y = k(x^4 - x^2)$$

where:
   y represents the ordinates of the points of the curve measured on an axis Y coinciding with the center line of the tooth;
   x represents the abscissas of the points of the curve measured on an axis X perpendicular to the axis Y; and
   k is a coefficient chosen within the range of values between 0.05 and 2.

3. A toothed belt according to claim 2, wherein the values of the coefficient k are chosen within the range values between 0.1 and 1.5.

4. A toothed belt according to claim 1, wherein the surface of the toothing of the toothed belt is covered by two layers of fabric doubled together with a film of elastomeric material interposed therebetween.

5. A toothed belt according to claim 4, wherein the surface of the toothing of the toothed belt is covered by a self-lubricating fabric.

6. A toothed belt according to claim 1, wherein said deformation by flexure of said two ribs brings said two ribs into reciprocal contact with each other.

7. A toothed belt for coupling with a toothed pulley having a plurality of teeth separated by grooves to form a positive-drive power transmission system, said belt comprising:
   an annular body formed of one of an elastomeric material and a plastic material,
   a tensile stress-resistant structure embedded in said annular body, said structure comprising a plurality of flexible and substantially inextensible cords extending in a longitudinal dimension of said cords, longitudinal axes of said belt being parallel to and coplanar with one another,
   a toothing projecting from one face of said annular body, said toothing comprising a plurality of teeth formed of one of an elastomeric material and a plastic material and separated from one another at root portions thereof by grooves,
   each tooth of said toothing having a crest with a contour so as to enable a localized elastic deformation of the crest, said contour comprising at least one slot in said crest extending transversely of the belt, said contour substantially conforming to a biquadratic curve corresponding to the formula $$y = K(x^4 - x^2),$$

where y represents ordinants of points on said curve measured on a y-axis coinciding with a center line of a respective tooth, x represents abscissae of points on said curve measured on an x-axis perpendicular to said y-axis and extending longitudinally of said belt and K is a coefficient with a value between 0.05 and 2.0.

8. The toothed belt as in claim 7, wherein said value of K is between 0.1 and 1.5.

* * * * *